A. F. W. PARTZ.
PROCESS OF COLLECTING GOLD AND SILVER FROM ORES.

No. 90,955. Patented June 8, 1869.

United States Patent Office.

AUGUST F. W. PARTZ, OF OAKLAND, CALIFORNIA.

Letters Patent No. 90,955, dated June 8, 1869.

IMPROVED PROCESS OF COLLECTING GOLD AND SILVER FROM ORES.

The Schedule referred to in these Letters Patent and making part of the same.

*To all whom it may concern:*

Be it known that I, AUGUST F. W. PARTZ, of Oakland, in the county of Alameda, and State of California, have invented certain new and useful Improvements in the Electro-Metallurgical Treatment of Ores; and I hereby declare that the following is a full, clear, and exact description thereof, which will enable those skilled in the art to make and apply the same, reference being had to the accompanying drawings, forming part of this specification, in which—

Figure 1:
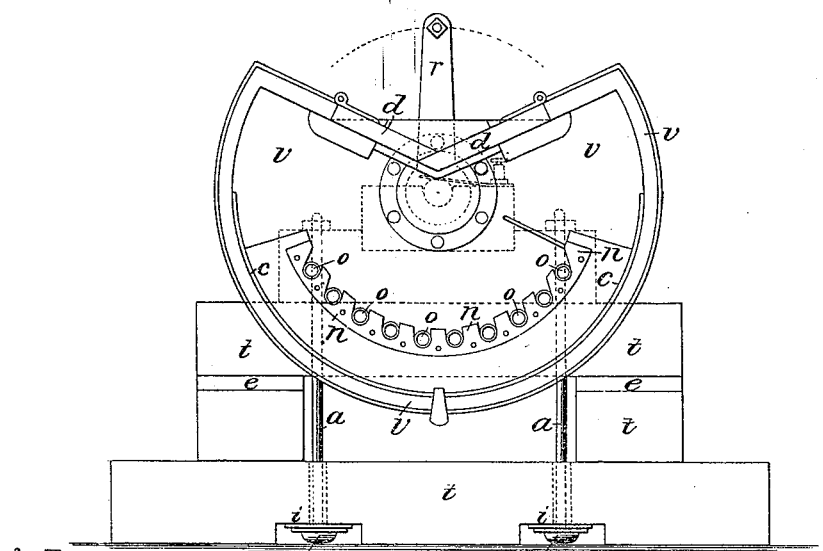

Figure 1 represents a vertical cross-section, and

Figure 2:
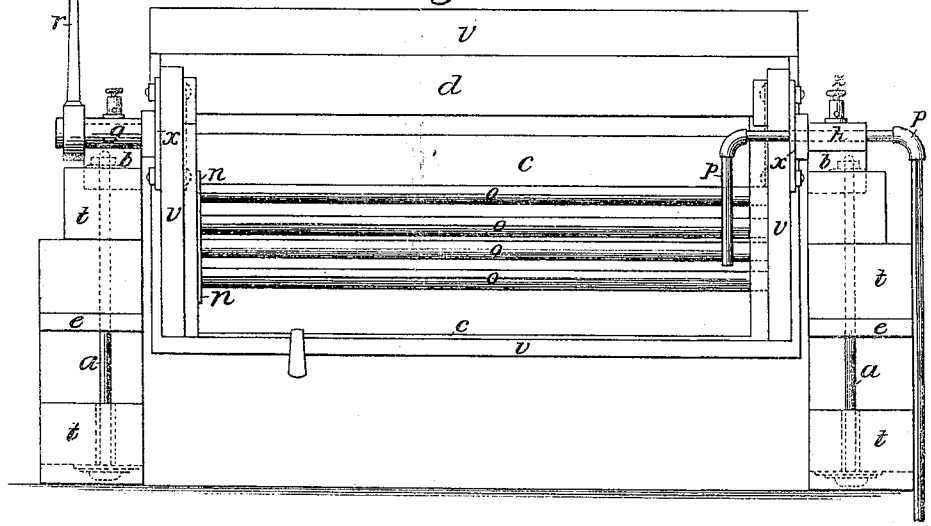

Figure 2, a vertical longitudinal section of the apparatus I employ for the treatment of ores by the aid of electricity.

During the last ten years, various attempts have been made in this country to apply electricity to the working of crude ores of silver and gold.

The operations were generally performed in so-called "amalgamating-pans," or vessels of similar construction, in which the poles of galvanic batteries were placed, and the process was aided by the addition to the ore-pulp of sulphate of copper, chloride of sodium, or such other salts as are commonly used in pan-amalgamation.

The results, so far as regards the winning of the metals contained in the ores, were, in some instances, quite favorable, but the long time required for the operation, and the consequent great consumption of zinc and acid, in the galvanic batteries employed for generating the electro-currents, seem to have been a serious obstacle to the introduction of this mode of working ores.

In the application of electricity to the treatment of ores containing sulphurets, and such other metalliferous minerals as must be decomposed before their constituent elements can combine to salts capable of forming electrolytes, from which metals may be reduced, it is a necessary condition, for the success of the operation, that each particle of such minerals be brought in contact with the positive electrode, and kept in contact with the same, until it is decomposed.

This requirement has been sought to be met by an agitation of the ore-pulp, while under the influence of the electro-current, by means of revolving arms, stirrers, or drags, so that all the particles to be decomposed might successively and repeatedly be thrown in contact with the positive electrode; but, as this contact must necessarily be of a certain duration, sufficient to allow the intended chemical change to be effected, and, as the employment of the means referred to insures, at best, but a momentary contact, which had, consequently, often to be repeated, the operation, in order to approach completeness, had to be continued for a length of time economically impracticable.

The nature of my invention consists in so placing and imparting such motion to the positive electrode, or pole-plate, that the ore-pulp rests upon the same, and the heavier particles of the ore, which mainly consist of combinations to be decomposed, are caused to settle and remain in contact with the said electrode, until their decomposition has taken place; also, in employing metallic tubes as negative electrodes, on account of the large surface which they afford, and the facility with which they are removed, cleaned, and replaced, the said tubes being closed at their ends.

The accompanying drawings represent an apparatus well adapted to the working of argentiferous ores, by the aid of electricity, upon the plan above stated. It will, however, be apparent that any apparatus based upon the same plan, though differently constructed, may be employed to the same effect.

With certain modifications, hereinafter mentioned, the said apparatus may also be employed in working ores of gold, copper, and other metals.

$v$ is a wooden vessel which forms a segment of a cylinder, and is closed by the lids $d$ $d$.

$g$ and $h$ are gudgeons, bolted to the sides of the vessel $v$, by means of the flanches $x$ $x$, and resting in the bearings $b$ $b$.

$r$ is a crank fastened to the gudgeon $g$.

Lengthwise through the gudgeon $h$ is bored a hole just wide enough to allow the steam-pipe $p$ to pass through it, and remain in place when the gudgeon is turned.

$t$ $t$ are pieces of timber, forming the support for the bearings $b$ $b$.

$e$ $e$ are plates of glass inserted between the said timbers, for the purpose of insulation.

$a$ $a$ are iron rods or bolts, by which the said timbers are firmly held together.

The holes through which these rods or bolts pass in the lower timbers, are of about twice the diameter of the rods, so that the latter may not touch the wood, and between the bolt-heads $w$ $w$ and the timbers, disks of India rubber, $i$ $i$, are inserted, also for the purpose of insulation.

To the inner periphery of the vessel $v$, a sheet of copper, $c$, is fastened, which forms the positive electrode, and is, by means of a wire which passes through the side of the vessel $v$, brought in metallic connection with the flanch $x$, attached to the gudgeon $h$.

$o$ $o$ are tubes of copper or brass, the ends of which, on one side of the vessel $v$, rest in holes made in the wood, while, on the other side, they rest upon the support $n$, which is made of copper or brass, and so shaped that the said tubes can easily be removed, and are not thrown out of place on the vessel $v$ being put into a rocking motion.

By means of a wire which passes through the side of the vessel $v$, the support $n$ is brought in metallic connection with the flanch $x$, attached to the gudgeon $g$.

The tubes $o$ $o$ being placed, by the support $n$, in metallic contact, form the negative electrode.

$s$ and $z$ are binding-screws, to each of which a spring of steel or brass is fastened, which springs rest upon the gudgeons $g$ and $h$.

To the screw $z$ is attached the positive, and to the screw $s$ the negative-pole wire of a galvanic battery, or some other generator of dynamic electricity.

By means of this apparatus, argentiferous ores are worked as follows:

The ore, previously pulverized, is placed in the vessel $v$, together with a solution of chloride of sodium sufficient to form an easily-flowing pulp, which should occupy about one-third of the inner space of the vessel.

To the crank $r$ a connecting-rod is attached in the usual manner, and by it such a motion is imparted to the said crank as to bring the same alternately from forty to fifty degrees either way from its vertical position. The speed of this motion should be of from fifteen to twenty double strokes per minute.

The connection of the galvanic battery being made as above stated, the process of decomposition and reduction at once ensues.

The effect of the said motion upon the ore-pulp is such as to prevent the earthy portion of the ore from settling, while it, at the same time, facilitates the sinking through the said pulp of all the heavier particles of the ore, and their concentration upon the positive-pole plate $c$, where they collect in a layer, which is kept agitated just enough to insure the constant forming of new points of contact between the said particles and pole-plate.

By the electrolytic action induced in the ore-pulp, and which is aided by the application of heat introduced in the form of steam, through the pipe $p$, water and chloride of sodium are decomposed, oxygen and chlorine are disengaged at the positive electrode, and ready to enter into new combinations, they effect under the influence of the electro current, the decomposition of the sulphurets and other metalliferous compounds resting upon the positive-pole plate, while they also attack the said pole-plate, forming, with the material thereof, oxychloride of copper, which, in turn, aids in the formation of chloride of silver. The latter dissolves in the solution of chloride of sodium present, and from it metallic silver is finally reduced, and deposited upon the negative electrode formed by the tubes $o$ $o$.

As the silver thus reduced is apt to be deposited in a loose, flocculent, or spongy state, the said tubes should be amalgamated with mercury, to better insure its adhesion and collection.

An addition of sulphate of copper to the ore-pulp may, under circumstances, be advisable, but the success of the operation does not depend on it.

The positive-pole plate $c$ being dissolved in proportion nearly equivalent to the silver reduced upon the tubes $o$ $o$, must, from time to time, be restored. To this end, the remaining portion of the said pole-plate needs not to be removed, it being necessary only to cover the spots where the metal has disappeared with patches of copper fastened to the vessel $v$ by means of copper nails.

The apparatus above described may also be employed for the extraction of gold from auriferous pyrites, in which case, however, a positive electrode of iron or carbon must be substituted for that of copper. The same change becomes necessary in the treatment of sulphurets and other ores of copper, in which also solid rods of copper, in place of tubes, may be used as negative electrodes.

According to the character of the ores under treatment, an alkaline sulphate or nitrate, or sulphate of iron, may be substituted for chloride of sodium, or used in connection therewith.

For reasons of economy, the employment of galvanic batteries is admissible only in the working of ores of silver. For other ores, magneto-electric machines (or thermo-electric batteries, whenever they shall have been rendered sufficiently practicable,) must, therefore, be used in their stead, so that in generating the electric force required, carbon may be consumed in place of zinc.

I claim as my invention, and desire to secure by Letters Patent—

1. Placing the positive electrode at the bottom of the vessel containing the ore-pulp, and imparting to the said vessel and electrode a swinging or shaking motion, which will cause the heavier particles of the ore to settle, and thus be brought and kept in contact with the said electrode, substantially in the manner and for the purpose herein specified.

2. The use of metallic tubes as negative electrodes, substantially as described.

AUGUST F. W. PARTZ. [L. S.]

Witnesses:
J. L. BOONE,
GEO. H. STRONG.